(12) United States Patent
Karam et al.

(10) Patent No.: US 7,593,747 B1
(45) Date of Patent: Sep. 22, 2009

(54) TECHNIQUES FOR CONTROLLING DELIVERY OF POWER TO A REMOTELY POWERABLE DEVICE BASED ON TEMPERATURE

(75) Inventors: Roger Karam, Mountain View, CA (US); Meilissa R. Lum, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 637 days.

(21) Appl. No.: 11/174,337

(22) Filed: Jul. 1, 2005

(51) Int. Cl.
*H04B 7/00* (2006.01)
(52) U.S. Cl. .................. 455/522; 702/182; 455/69
(58) Field of Classification Search ............ 455/522
See application file for complete search history.

(56) References Cited

U.S. PATENT DOCUMENTS

| | | | | |
|---|---|---|---|---|
| 3,761,792 A * | 9/1973 | Whitney et al. | ............. | 318/788 |
| 5,162,817 A * | 11/1992 | Tajika et al. | .................. | 347/7 |
| 5,345,592 A * | 9/1994 | Woodmas | .................. | 725/130 |
| 5,793,293 A * | 8/1998 | Melamud et al. | ............ | 340/596 |
| 5,839,654 A * | 11/1998 | Weber | ........................ | 236/47 |
| 5,995,350 A | 11/1999 | Kopelman | .................. | 361/103 |
| 6,040,759 A * | 3/2000 | Sanderson | .................. | 725/130 |
| 6,522,119 B1 * | 2/2003 | Hernandez | .................. | 323/324 |
| 6,539,336 B1 * | 3/2003 | Vock et al. | .................. | 702/182 |
| 6,559,771 B2 | 5/2003 | Landis | ........................ | 340/603 |
| 6,817,760 B2 * | 11/2004 | Mende et al. | ............... | 374/152 |
| 6,996,458 B2 | 2/2006 | Pincu et al. | ................. | 700/297 |
| 7,005,992 B2 * | 2/2006 | Kawai et al. | ................ | 340/588 |
| 7,029,145 B2 | 4/2006 | Frederick | .................... | 362/234 |
| 7,107,162 B2 * | 9/2006 | Zima et al. | .................... | 702/65 |
| 7,122,965 B2 * | 10/2006 | Goodman | ............. | 315/111.21 |
| 7,141,763 B2 * | 11/2006 | Moroz | ....................... | 219/390 |
| 7,154,381 B2 * | 12/2006 | Lang et al. | ............. | 340/310.11 |
| 7,161,265 B2 * | 1/2007 | Barthelemy | .................. | 307/116 |
| 7,184,902 B2 * | 2/2007 | El-Ibiary | ..................... | 702/60 |
| 7,332,920 B1 * | 2/2008 | Arlow | ........................ | 324/760 |
| 7,356,438 B2 * | 4/2008 | Schaumann et al. | ......... | 702/130 |
| 7,363,525 B2 * | 4/2008 | Biederman et al. | .......... | 713/340 |
| 7,433,170 B2 * | 10/2008 | Lluch et al. | ................. | 361/139 |
| 2003/0098673 A1 * | 5/2003 | Hernandez | .................. | 323/234 |
| 2004/0052294 A1 * | 3/2004 | Kawai et al. | ................ | 374/102 |
| 2004/0178925 A1 * | 9/2004 | Kawai et al. | ........... | 340/870.17 |
| 2005/0007709 A1 * | 1/2005 | Wright | ........................ | 361/43 |

(Continued)

OTHER PUBLICATIONS

Desmet et al., "Thermal Analysis of influence of nonlinear unbalanced and asymmetric loads on current conducting capacity of LV-cables", IEEE 2003, 8 pages.*

*Primary Examiner*—Duc Nguyen
*Assistant Examiner*—Hai V Nguyen
(74) *Attorney, Agent, or Firm*—BainwoodHuang

(57) ABSTRACT

An improved method is performed within power-sourcing equipment. The method controls delivery of power to a remotely powerable device through a communications pathway that connects the power-sourcing equipment to the remotely powerable device. The method involves obtaining an initial resistance value representing an initial resistance of the communications pathway, and obtaining an operating resistance value representing an operating resistance of the communications pathway after obtaining the initial resistance value. The method further involves generating a temperature change result based on the initial resistance value and the operating resistance value, and selectively one of enabling, scaling back and disabling delivery of power to the remotely powerable device through the communications pathway based on the temperature change result.

33 Claims, 7 Drawing Sheets

U.S. PATENT DOCUMENTS

| | | | |
|---|---|---|---|
| 2005/0035666 A1* | 2/2005 | Barthelemy | 307/125 |
| 2005/0044431 A1* | 2/2005 | Lang et al. | 713/300 |
| 2005/0057165 A1* | 3/2005 | Goodman | 315/111.51 |
| 2005/0057865 A1* | 3/2005 | Veloo et al. | 361/56 |
| 2005/0067991 A1* | 3/2005 | El-Ibiary | 318/490 |
| 2005/0083206 A1* | 4/2005 | Couch et al. | 340/657 |
| 2005/0195975 A1* | 9/2005 | Kawakita | 380/30 |
| 2005/0222808 A1* | 10/2005 | Zima et al. | 702/182 |
| 2006/0054558 A1* | 3/2006 | Jones et al. | 210/656 |
| 2006/0063509 A1* | 3/2006 | Pincu et al. | 455/402 |
| 2006/0097758 A1* | 5/2006 | Thurlow et al. | 327/79 |
| 2006/0098375 A1* | 5/2006 | Lluch et al. | 361/139 |
| 2007/0038396 A1* | 2/2007 | Zima et al. | 702/65 |
| 2007/0118308 A1* | 5/2007 | El-Ibiary | 702/60 |
| 2008/0189061 A1* | 8/2008 | Scholtz et al. | 702/65 |

* cited by examiner

TECHNIQUES FOR CONTROLLING DELIVERY OF POWER TO A REMOTELY POWERABLE DEVICE BASED ON TEMPERATURE

BACKGROUND

A typical Power-over-Ethernet (PoE) application involves supplying power from power-sourcing equipment (PSE) to a powered device (PD) through a cable (e.g., Category-3 cable, Category-5 cable, Category-6 cable, etc.). During operation, the PSE performs a discovery routine by testing for the presence of a known impedance on the PD end of the cable (e.g., a 25K-Ohm resistor). If the PSE determines that such an impedance is present, the PSE supplies power to the PD through the cable and periodically checks to make sure the PD is still present. If the PSE determines that the PD is no longer present, the PSE re-performs the discovery routine by continuing to periodically test for the presence of the known impedance on the PD.

When the PSE supplies power to the PD through the cable, the possibility exists that the temperature of the conductive material within the cable (e.g., copper) could increase beyond a safe limit. Once the temperature exceeds this limit, the PoE infrastructure and perhaps the surrounding environment could sustain permanent damage. In some cases, the results could be catastrophic (e.g., the cable insulation could melt, the cable could start a fire, a trace in a patch panel could fuse and become open, etc.).

For example, suppose that a PSE delivers power to a PD through wire pairs of a cable. Further suppose that there is a substantial increase in DC resistance through a wire in one of the wire pairs (e.g., the wire is suddenly cut, the wire suddenly provides high impedance due to faulty manufacturing, etc.). In response to a reduction in current through the failed wire of that wire pair, more current may pass through the non-failed wire of the wire pair. Under such a condition, the PSE may be able to detect the failure and automatically shut off current through that wire pair (e.g., the PHY of the PSE may sense impaired data delivery or loss of the link, a TDR circuit of the PHY may flag an open condition on that wire pair, etc.).

However, in some situations, the PSE may not be able to detect the increase in DC resistance and thus continue to supply current through the cable. For instance, the DC resistance could increase but not affect data flow (e.g., in a 10BaseT system). Additionally, due to the particular implementation of PHY circuitry and/or lower losses in the cable, the PSE may not be able to predict the potential overheating of a cable. Furthermore, the PSE may not even have a PHY/TDR attached to the cable such as when the PSE supplies power only and no data on two pairs in a cable (e.g., 10/100 Ethernet). Examples of situations where a PHY is absent include mid-span power systems, and switches providing power through unused pairs. Moreover, even with PHY-based TDR, there are limitations in performing accurate temperature measurements since the TDR typically has no direct access to the DC resistance of the cable that an inline power controller has.

To avoid creation of a catastrophic event due to cable overheating, some have considered employing an infrared detection circuit to monitor the temperature of the cable. In particular, an infrared camera of the infrared detection circuit would scan the cable, or a bundle of cables, in an attempt to identify whether the temperature of the cable ever surpasses a critical level. If the cable temperature were to exceed this level, the infrared detection circuit would then send a signal to the PSE directing the PSE to longer supply power to the PD through the cable.

SUMMARY

Unfortunately, there are deficiencies to using an infrared detection circuit to control PoE power delivery to a PD through a cable. For example, it is unlikely that the infrared camera of such an infrared detection circuit would be able to scan an entire cable (e.g., due to obstructions within the environment). Rather, such scanning would likely be limited to only a localized section of the cable thus leaving the remaining portions of the cable vulnerable to entering a high-temperature condition in an undetected manner. Additionally, the infrared camera would not sense the temperature of the copper conductor but only the temperature of outside of the cable (i.e., the outer insulation) and thus not provide an accurate temperature measurement. Furthermore, it is likely that the infrared detection circuit itself would require delivery of power through its own cable and thus itself pose another cable-related safety concern. Moreover, other means such as embedding temperature sensors within a bundle of cables along an entire run (e.g., across a building) would require the proper embedding of such sensors, taking apart the infrastructure, and cost money and network downtime and would still fail to predict the temperature of the metal inside the cable.

In contrast to the above-described infrared detection circuit approach, improved techniques control delivery of power to a remotely powerable device based on generating temperature change results which are determined from resistance measurements (e.g., using the temperature coefficient of the cable conductor material). Such resistance measurements are easily obtainable and thus provide convenient and reliable means of temperature measurement.

One embodiment is directed to a method, performed within power-sourcing equipment (PSE), for controlling delivery of power to a remotely powerable device through a communications pathway that connects the power-sourcing equipment to the remotely powerable device. The method involves obtaining an initial resistance value representing an initial resistance of the communications pathway, and obtaining an operating resistance value representing an operating resistance of the communications pathway after obtaining the initial resistance value. The method further involves generating a temperature change result based on the initial resistance value and the operating resistance value, and one of (i) enabling, (ii) scaling back, or (iii) disabling delivery of power to the remotely powerable device through the communications pathway based on the temperature change result.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Improved techniques control delivery of power to a remotely powerable device based on generating temperature change results which are determined from resistance measurements (e.g., using the temperature coefficient of the cable conductor material). Such resistance measurements are easily obtainable and thus provide convenient and reliable means of temperature measurement. Such measurements enable a power source to accurately measure power loss in a specific cable and thus more accurately predict and budget its power allocation rather than rely on a standardized budgeted amount. For example, the 802.3af standard has allocated for a minimum loss in a cable of approximately 2.4 watts, even though the power loss through an actual cable (e.g., a very short cable) may be much lower than 2.4 watts.

Figure 1:
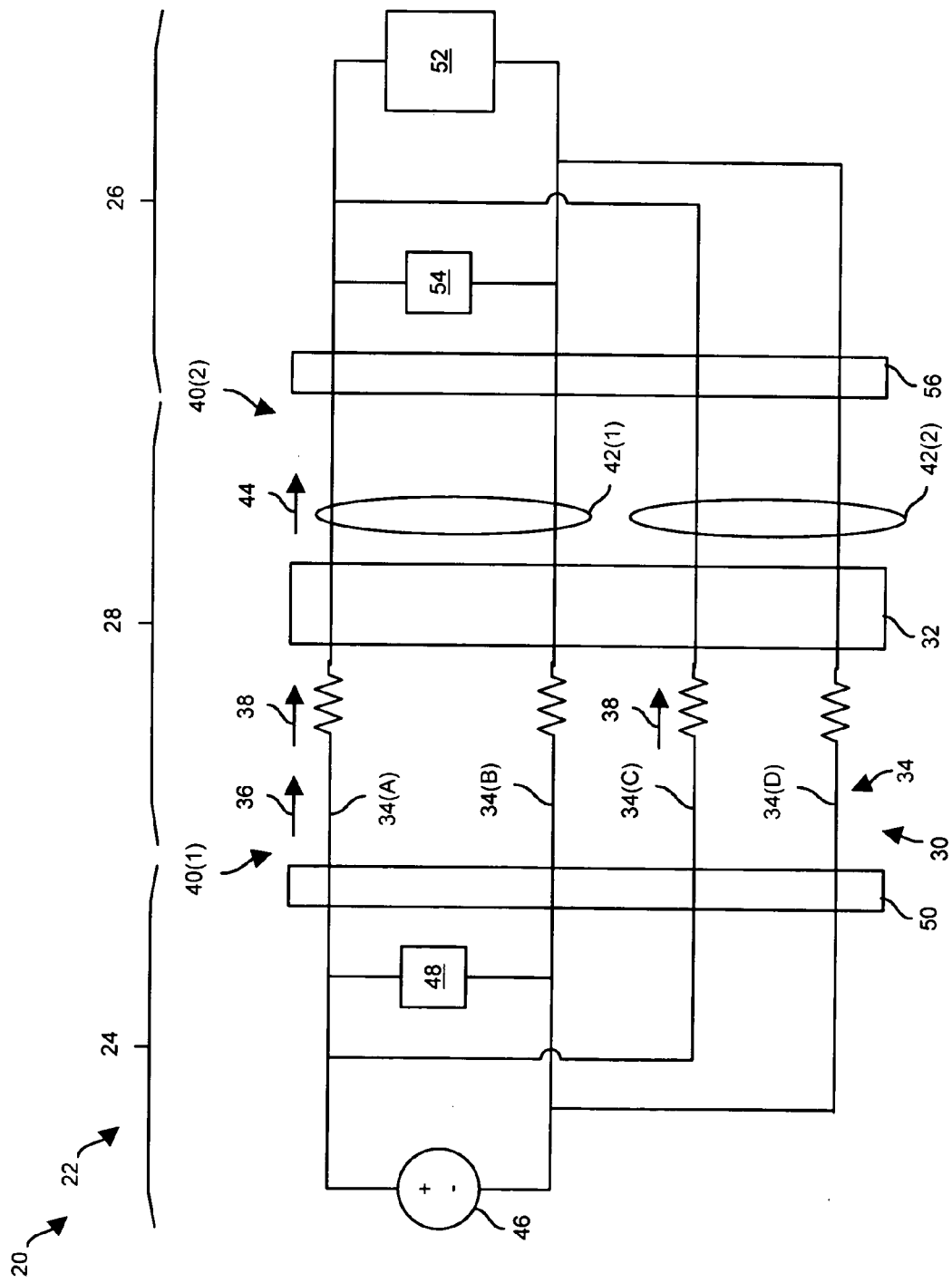
FIG. 1 shows a particular layout of an electronic system which controls power delivery to a remotely powerable device by temperature sensing based on changes in resistance through conductors carrying communications signals and power.

FIG. 1 shows a layout 20 for a Power-over-Ethernet (PoE) system 22 which controls the supplying of power based on temperature change results which are determined from resistance measurements. The PoE system 22 includes power-sourcing equipment (PSE) 24, a remotely powerable device (PD) 26, and a communications pathway 28. The communications pathway 28 includes communications cabling 30 (i.e., one or more cables) and a patch panel 32. The communications cabling 30 includes pairs of electrical conductors 34(A), 34(B), 34(C), 34(D) (collectively, conductor pairs 34) which are capable of carrying communications signals 36 (e.g., differential mode) between the PSE 24 and the PD 26, and power 38 (e.g., common mode) from the PSE 24 to the PD 26.

In the layout 20, the PSE 24 resides at a first end 40(1) of the communications pathway 28, and is configured to transmit a communications signal 36 to the PD 26 through the conductor pair 34(A), and receive a communications signal 36 from the PD 26 through the conductor pair 34(B). Similarly, the PD 26 resides at a second end 40(2) of the communications pathway 28, and is configured to transmit a communications signal 36 to the PSE 24 through the conductor pair 34(B), and receive a communications signal 36 from the PSE 24 through the conductor pair 34(A). Accordingly, a first set 42(1) of conductor pairs 34(A), 34(B) are communications signal carrying pairs, and a second set 42(2) of conductor pairs 34(C), 34(D) are non-communications signal carrying pairs.

Additionally, in the layout 20, the PSE 24 is configured to supply power 38 to the PD 26 using all of the conductor pairs 34. In particular, the conductor pair 34(A), operates as the supply leg for current 44, and the conductor pair 34(B) operates as the return path for the current 44. Similarly, the conductor pair 34(C), operates as the supply leg for additional current, and the conductor pair 34(D) operates as the return path for the additional current.

As generally shown in FIG. 1, the PSE 24 includes, among other things, a power source 46, a monitoring circuit 48, and a connection interface 50 (e.g., an RJ-45 connector interface). Similarly, the PD 26 includes, among other things, a load 52 (e.g., a Voice-over-IP phone), a monitoring circuit 54, and a connection interface 56 (e.g., another RJ-45 connector interface). It should be understood that the monitoring circuits 48, 54 are shown as extending across conductor pairs 34 for simplicity but that such circuits 48, 54 preferably include circuits which connect in series with the circuits 48, 54. In some arrangements, the monitoring circuit 48 includes a current sense resistor in series with the power source 46 supply leg (e.g., 1-Ohm or less in value), and a voltage amplifier buffer driving an analog/digital converter circuit configured to measure the voltage drop across that resistor in order to enable the PSE 24 to determine the amount of current through the power source 46 supply leg. In such arrangements, the monitoring circuit 54 includes a similar current sense resistor in series on the power source 46 supply leg in order to enable the PD 26 to sense current as well.

It should be understood that the circuitry of the PSE 24 and the PD 26 further includes a variety of (i) filters, (ii) relays or power transistors that enable or disable power flow out of the PSE 24 in the case of the PSE 24, and into the PD 26 in the case of the PD 26, and (iii) internal protection circuits, but that such circuits are omitted from FIG. 1 for simplicity. Such filtering circuits enable isolation of communications signals on each conductor pair 34, and the current on conductor pairs 34(A), 34(B) from any current on the conductor pairs 34(C), 34(D) (and vice versa). Additionally, such internal protection circuits isolate the internal circuits of the PSE 24 and the PD 26 from direct voltages and currents on the conductor pairs 34. Further details of the operation of the PSE 24 and the PD 26 will now be provided with reference to FIGS. 2 and 3.

Figure 2:
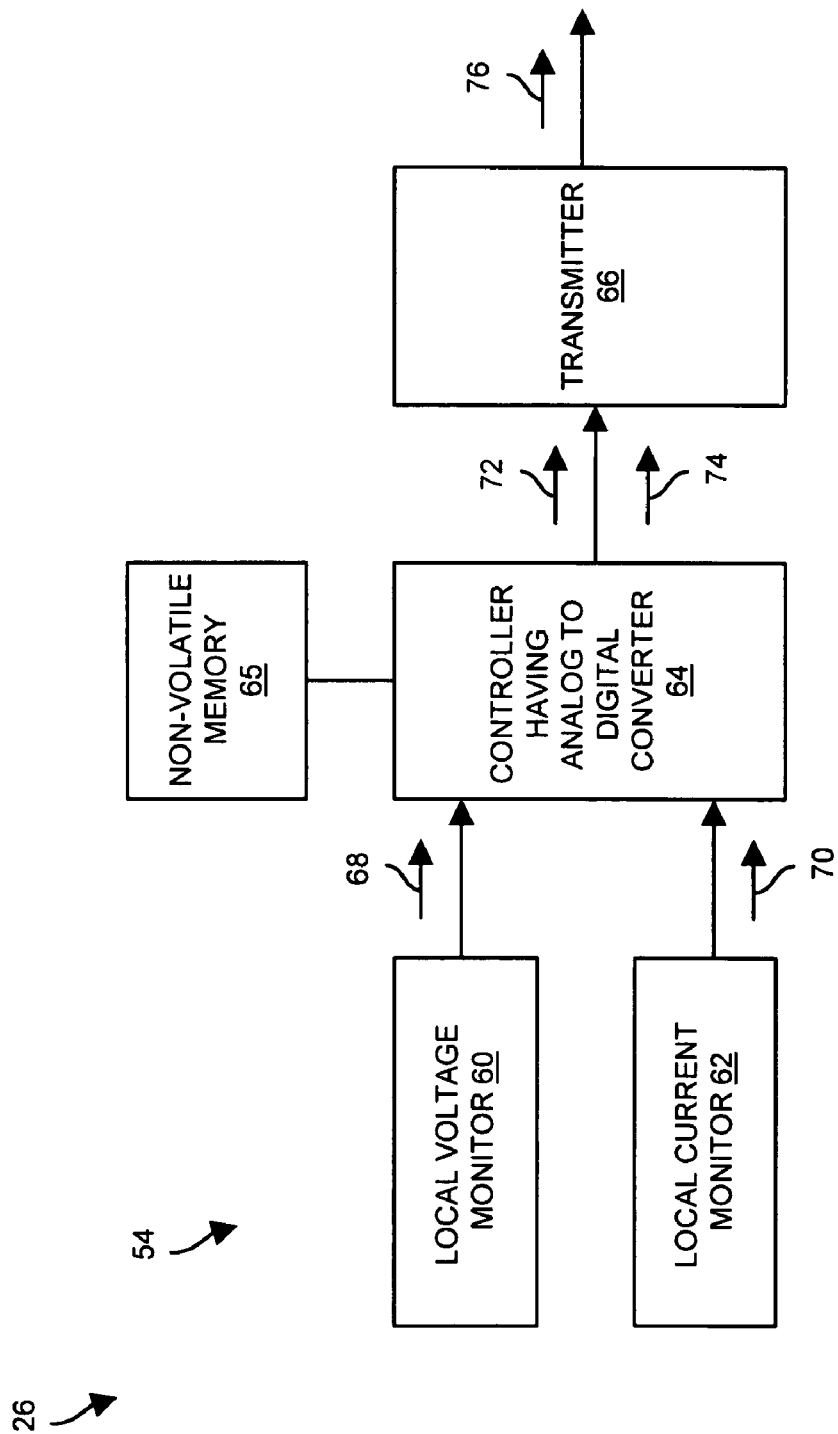
FIG. 2 shows a block diagram of various circuits of the remotely powerable device of FIG. 1.
Figure 3:
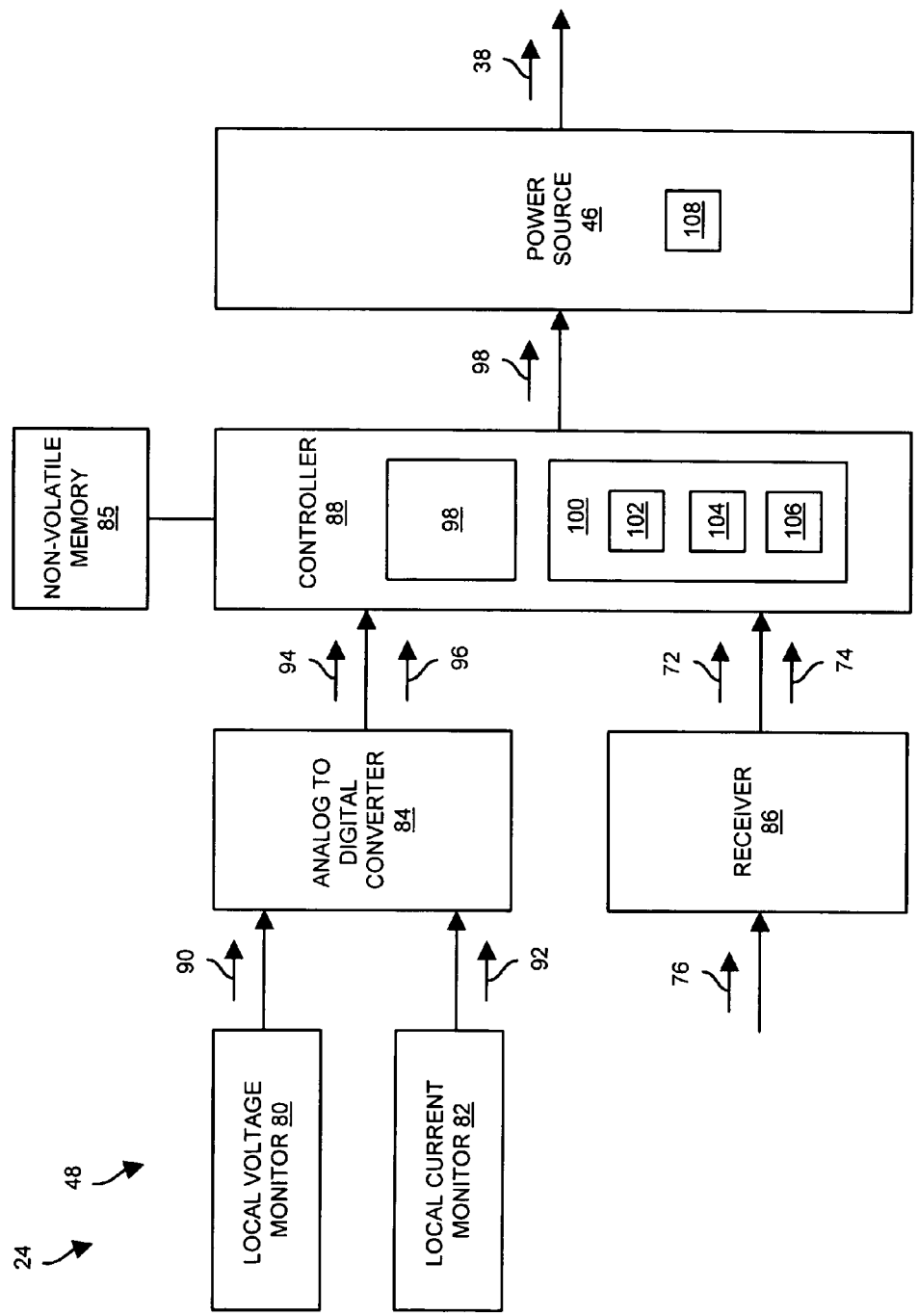
FIG. 3 shows a block diagram of various circuits of the power-sourcing equipment of FIG. 1.

FIG. 2 shows various circuits of the PD 26, and FIG. 3 shows various circuits of the PSE 24. As shown in FIG. 2, the monitoring circuit 54 of the PD 26 includes a local voltage monitor 60 and a local current monitor 62. The PD 26 further includes a controller having an analog-to-digital converter (ADC) 64, non-volatile memory 65, and a transmitter 66.

During operation of the PD 26, the local voltage monitor 60 is configured to measure the input voltage at the end 40(2) of the communications pathway 28 (also see FIG. 1). In particular, the local voltage monitor 60 is configured to (i) sense the potential difference across the conductor pairs 34(A) and 34(B) (e.g., at the center taps of isolation transformers), and (ii) output an analog voltage signal 68 identifying the sensed potential difference. The local current monitor 62 is configured to (i) measure the current 44 through the conductor pairs 34(A), 34(B), and (ii) output an analog current signal 70 identifying the amount of current through the conductor pairs 34(A), 34(B). The controller having the ADC 64 is configured to generate a digital PD voltage signal 72 and a digital PD current signal 74 based on the analog voltage signal 68 and the analog current signal 70, respectively. The digital PD voltage signal 72 defines a value which represents the input voltage at the end 40(2) of the conductor pairs 34(A), 34(B) of the communications pathway 28, and the digital PD current signal 74 defines a value which represents the current 44 through the conductor pairs 34(A), 34(B) of the communications pathway 28. The digital voltage and current signals 72, 74 may be stored in non-volatile memory 65 for purposes of retrieval at a later time. The transmitter 66 is configured to periodically send these values (i.e., electrical parameters) in the form of a PD signal 76 to the PSE 24 through the conductor pair 34(B).

In some arrangements, the transmitter 66 includes standard Ethernet PHY technology where differential signaling is used to deliver packet data. In these arrangements, a packet has the digital signal setting encoded to deliver the amplitude of voltage, current, temperature and any other relevant data back to the PSE 24 or the power supplying device.

In some arrangements, the transmitter 66 is capable of delivering the same data even though the PD 26 is not fully powered. In such arrangements, the transmitter 66 carries out common mode communications by modulating the voltage signal during detection in the PSE 24 (equivalent derivative of 46 shown in FIG. 1). In such arrangements, the PSE 24 delivers a message to the PD 26 by modulating its common mode voltage, while the PD 26 modulates its current to send information back all while the power has not been fully turned on from the PSE 24. In order for the PD 26 to deliver its own measurements back to the PSE 24 using the data channel (i.e., the communications pathway 28 in FIG. 1), the PD 26 preferably stores the measurements in non-volatile memory 65 of the PD 26. When the power 38 is turned on, the controller 64 in its initialization routine retrieves such data from the non-volatile memory 65 and sends the data to the PSE 24 via the data channel (e.g., an Ethernet link) along with a host of other data.

It should be understood that, when the PD 26 is inline powered, the transmitter 66 may be configured to only send an update if there is a change that calls for an update. This requirement imposes additional burden and cost on the power controller 64 of the PD 26. Such cost stems from the need for an isolated digital interface integrated into the power controller 64 in the PD 26 that crosses the isolated DC/DC boundary where the power for the digital interface of the PHY and/or PHY and the memory 65 may exist. Such an interface though costly is capable of being used to initiate a PSE-based query to a smart PD 26 to reduce its power requirements thus insuring the validity of measurements of the temperature rise in a cable of the communications pathway 28 ahead of powering down the PD 26. For example, if a PD 26 is faulty and does not respond to such request, that in itself is a good indicator of something out of control. Also if the PD 26 succeeds in scaling back its power requirements upon a request from the PSE 24 via such added interface (i.e., the PD 26 reduces its power consumption while continuing to perform a series of operations), and the PSE 24 can detect a decrease in temperature, the user or administrator are informed all while keeping the PD 26 in a usable lower power mode with a cable of the communications pathway 28 that is cooler until the problem is understood and solved. Such interface may resemble what is known as the SMBUS interface, I2C interface or the like, and it uses opto-isolators or transformers to allow the PD controller 64 to communicate with the PHY in the PD 26 for purposes of management, control, and frequent status updating (as in reading the local voltage and current for purposes of calculating the change in resistance). Such communication is capable of taking place in both directions between the PSE 24 and the PD 26 via standard Ethernet packets and using a protocol such as the Cisco Discovery Protocol (CDP). A smart PD 26 may be instructed to scale back its power consumption at night for example, when the user is no longer present, or it may display a message to the user asking for permission to scale back power (possibly eliminating non-critical availability of certain functions) to help reduce the cooling expense needed to keep the temperature of the building within a specified range.

As shown in FIG. 3, the monitoring circuit 48 of the PSE 24 includes a local voltage monitor 80 and a local current monitor 82. The PSE 24 further includes an ADC 84, a receiver 86, a controller 88, and non-volatile memory 89.

During operation of the PSE 24, the local voltage monitor 80 is configured to measure the input voltage at the end 40(1) of the communications pathway 28 (also see FIG. 1). In particular, the local voltage monitor 80 is configured to (i) sense the potential difference applied across the conductor pairs 34(A) and 34(B) (e.g., at the center taps of isolation transformers), and (ii) output an analog voltage signal 90 identifying the sensed potential difference. The local current monitor 82 is configured to (i) measure the current 44 through the conductor pairs 34(A), 34(B), and (ii) output an analog current signal 92 identifying the amount of current through the conductor pairs 34(A), 34(B). The ADC 84 is configured to generate a digital PSE voltage signal 94 and a digital PSE current signal 96 based on the analog voltage signal 90 and the analog current signal 92, respectively. The digital PSE voltage signal 94 defines a value which represents the applied voltage at the end 42(1) of the conductor pairs 34(A), 34(B) of the communications pathway 28, and the digital PSE current signal 96 defines a value which represents the current 44 through the conductor pairs 34(A), 34(B) of the communications pathway 28.

It should be understood that the controller 88 is capable of storing these digital signals 94, 96 in the non-volatile memory 85. Accordingly, the controller 88 is capable of further calculating an average which it then stores in the non-volatile memory 85 at lower frequency for future use and or to generate a heat map and or a graphical plot of historical data over time to enable comparison. If the PD 26 is a smart device that is equipped with the earlier-described interface, the PSE 24 may send a request based on these digital signals asking the PD 26 to reduce its power consumption while more reading are taken and averaged over time. If such a reduction in power consumption improves the operational temperature of the cable evidenced by the current measurements, the user or the administrator is informed to look into the whole link, from cable and patch panel to connectors in order to identify the proper course of action.

It should be further understood that the non-volatile memory 85 may be a shared memory device that is shared among all ports and inline power controllers in a system. Information stored in the non-volatile memory 85 is capable of including a date and time stamp, port number, an IEEE power class as defined in 802.3af or similar methods of the PD attached device, cable length (as determined by a TDR in the PHY), the number of powered pairs, a remote device ID, the voltage and current at the remote device 26 at different instances in time, temperature reading from different locations in a building to track the changes in ambient temperature (if available), date and time of resistance measurements, and a flag if the remote device 26 has been disconnected and or taken off line, along with a host of other useful information that helps track history of a device's performance and environmental variables that can affect it. If temperature sensors were deployed in a building and their data is shared with the controllers discussed in these arrangements, then a sudden rise in ambient temperature of the building where the cable run is present on a hot summer day that contributes to the rise in the temperature of the cables can be factored in the decision and would help account for the operational temperature of the cables as dictated in their specifications. A heat map of the heat or ambient temperature in a building can be derived from the resistance measurements of these arrangements if similar PD devices 26 attached to the PSE 24 on similar cable runs produces predictable heat rise patterns at specific times of the day and of the year.

Concurrently or within a short period of time from when the ADC 84 generates the digital PSE voltage signal 94 and the digital PSE current signal 96, the receiver 86 is configured to receive the PD signal 76 from the PD 26, and extract and provide the digital PD voltage signal 72 and the digital PD current signal 74 to the controller 88. The digital signal 74 may be stored in the non-volatile memory 85, at the location associated with the port number along with any other useful data that a smart PD may send. With knowledge of the PSE output voltage "V_PSE" (i.e., defined by the digital PSE voltage signal 94), the PD input voltage "V_PD" (i.e., defined by the digital PD voltage signal 72), and the current "I" (i.e., defined by either the digital PSE current signal 92 of the digital PD current signal 74 since the current 44 should be the same when measured at either end 42(1), 42(2)), the controller 88 is capable of computing the resistance "R" through the communications pathway 28. In some arrangements, the controller 88 includes a processor 98 and memory 100 which stores a specialized application 102. When the processor 98 executes this application 102, the processor 98 calculates the resistance "R" through the communications pathway 28. Accordingly, the controller 88 computes the resistance "R" through the communications pathway 28 at different times in order to determine a temperature change. Once the resistance "R" is known, a digital representation of its value may be stored in the non-volatile memory 85, at the location associated with the port number along with any other useful data such as the time and date stamp.

First, it should be understood that the controller 88 is capable of calculating the resistance "R" through the communications pathway 28 based on the voltage drop through the communications pathway 28 (i.e., the difference between the PSE output voltage "V_PSE" and the PD input voltage "V_PD") and the current 44. In particular, the controller 88 is capable of determining the resistance "R" of the communications pathway using Equation (1).

$$R = \frac{(V\_PSE - V\_PD)}{I}. \quad (1)$$

Second, it should be understood that, with knowledge of the conductor material used in the communications pathway 28, a change in temperature of that conductor material over time is capable of being derived from the change in the resistance "R" over time and the temperature coefficient of the conductor material. For example, in the context of a typical network infrastructure, the employed hardware is predominantly made of copper (e.g., see the cabling 30 and the patch panel 32 in FIG. 1). Along these lines, the change in temperature of the communications pathway 28 which can be assumed to be the change in temperature of the copper material within the cabling 30 is capable of being determined using Equation (2).

$$\text{Change in Temperature} = \frac{R\_OPERATING - R\_INITIAL}{R\_INITIAL \times 0.00393}. \quad (2)$$

In Equation (2), 0.00393 in Ohms per degrees Celsius is the temperature coefficient of copper, R_INITIAL is the resistance of the communications pathway 28 when the PSE 24 makes an initial baseline measurement (e.g., during an initial discovery phase prior to supplying power through the communications pathway 28), and R_OPERATING is the resistance of the communications pathway 28 when the PSE 24 makes periodic measurements over time while supplying power to the PD 26.

The PSE 24 and PD 26 preferably take the voltage and current measurements for the initial baseline resistance calculation soon after the PD 26 activates (e.g., during the PSE discovery phase, shortly after the PSE 24 transitions from the discovery phase to the delivery phase, etc.). Accordingly, R_INITIAL for the communications pathway 28 represents the resistance of the communications pathway 28 relatively close to startup conditions.

From then on, the PSE 24 and PD 26 continue to periodically take voltage and current measurements for operating resistance calculations which are performed by the controller 88 in an ongoing manner (e.g., every 10 seconds, every 30 seconds, etc.). Furthermore, the controller 88 periodically generates a temperature change result 104 and compares this temperature change result 104 to a predetermined threshold value 106 (FIG. 3). The processor 98 is capable of saving these results 104 in the memory 100 (e.g., in the form of a log).

If each temperature change result 104 stays lower than the predetermined threshold value 102, the controller 88 considers the communications pathway 28 to be at a nominal temperature. However, when a temperature change result 104 surpasses the predetermined threshold value 106, the controller 88 considers the communications pathway 28 to be potentially at a dangerous temperature and transitions to an error handling mode. In some arrangements, the controller 88 performs one or more additional temperature calculations to confirm that the communications pathway 28 is at a dangerous temperature and, if so, disables delivery of power to the PD 26 through the communications pathway 28 and sends a warning message to a user. Accordingly, the PSE 24 safely turns off the power 38 supplied to the PD 26 through the cabling 30 (e.g., by opening a switch 108 of the power source 46, see FIG. 3) and thus avoids causing damage to the communications pathway 28. Further details will now be provided with reference to FIG. 4.

Figure 4:
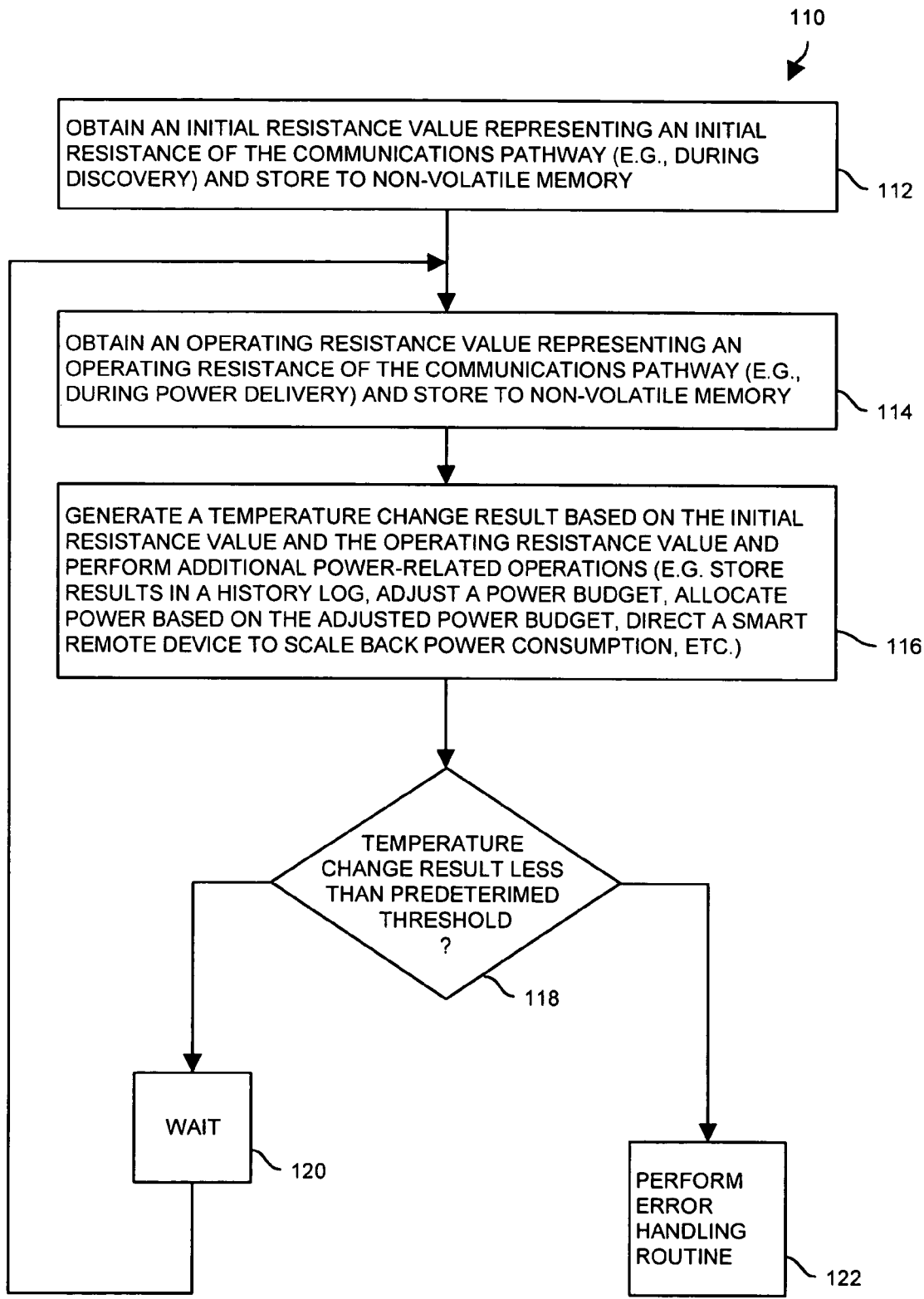
FIG. 4 shows a flowchart of a procedure which is performed by a controller of the power-sourcing equipment of FIG. 3.

FIG. 4 summarizes a procedure 110 which is performed by the controller 88 of the PSE 24. In step 112, the processor 98 of the controller 88 obtains the initial resistance value (e.g., the processor 98 reads R_INITIAL) from the memory 100. Recall that this initial resistance value is capable of being obtained by applying Equation (1) while using the initially measured voltages and current from the PSE 24 and the PD 26. Accordingly, step 112 preferably occurs during the discovery phase of the PSE's operation or shortly thereafter. The PSE 24 may opt to store a digital representation of R_INITIAL in the non-volatile memory 85.

Similarly, in step 114, the processor 98 obtains the operating resistance value (e.g., R_OPERATING) while the PSE 24 supplies power to the PD 26 during a power delivery phase. Again, recall that this operating resistance value is capable of being obtained by applying Equation (1) while using subsequently measured voltages and current from the PSE 24 and the PD 26. The PSE 24 may opt to store a digital representation of R_OPERATING in the non-volatile memory 85.

In step 116, the processor 98 generates a temperature change result 104 based on the initial resistance value and the operating resistance value. In some arrangements, the processor 98 logs this result 104 in the memory 100 and may store a copy in the non-volatile memory 85 (e.g., with a date and time stamp). In some arrangements, the processor 98 further calculates the actual power loss through the communications pathway, adjusts a power budget of the PSE 24, and allocates power to other devices based on the adjusted power budget.

In step 118, the processor 98 compares the temperature change result 104 with the predetermined threshold 106 (e.g., a value representing 10 degrees Celsius, 20 degrees Celsius, 30 degrees Celsius, etc.), and controls delivery of power to the PD 26 depending on the comparison. In particular, if the temperature change result 104 indicates that the change in temperature of the communications pathway 28 is lower than the predetermined threshold 106, the processor 98 proceeds to step 120. However, if the temperature change result 104 indicates that the change in temperature of the communications pathway 28 exceeds than the predetermined threshold 106 the processor 98 proceeds to step 122.

In step 120, the processor 98 waits a predefined period of time before repeating steps 114 and 116 (e.g., 10 seconds, 30 seconds, etc.). The processor 98 then proceeds back to step 114.

In step 122, the processor 98 performs an error handling routing such as turning off the switch 108 to prevent further delivery of power 38 to the PD 26 through the communications pathway 28. In some arrangements, the processor 98 repeats steps 114 and 116 (e.g., without waiting) at least one more time to confirm the rise in temperature before turning off delivery of power to the PD 26. Accordingly, the processor 98 is well-equipped to selectively enable and disable delivery of power 38 to the PD 26 through the communications pathway 28 based on the temperature change result 104.

Also, in step 122, the ambient temperature is evaluated (assuming sensors are present) to analyze if the rise is due to environmental issues. In particular, if the PD 26 is determined to be a smart PD, it may be instructed to scale its power requirements down and to inform its users of such request. The PD 26 may or may not be allowed to return to its full power requirement if the PSE 24 determines that its own measurements after such power cutback has changed for the better (e.g., if a decrease in temperature is detected after the PD power has been reduced). Either way a note is preferably sent to the administrator. In some arrangements, the administrator configures the PSE 24 to issue warnings only and keep everything operational. Further details will now be provided with reference to FIGS. 5 through 7.

Figure 5:
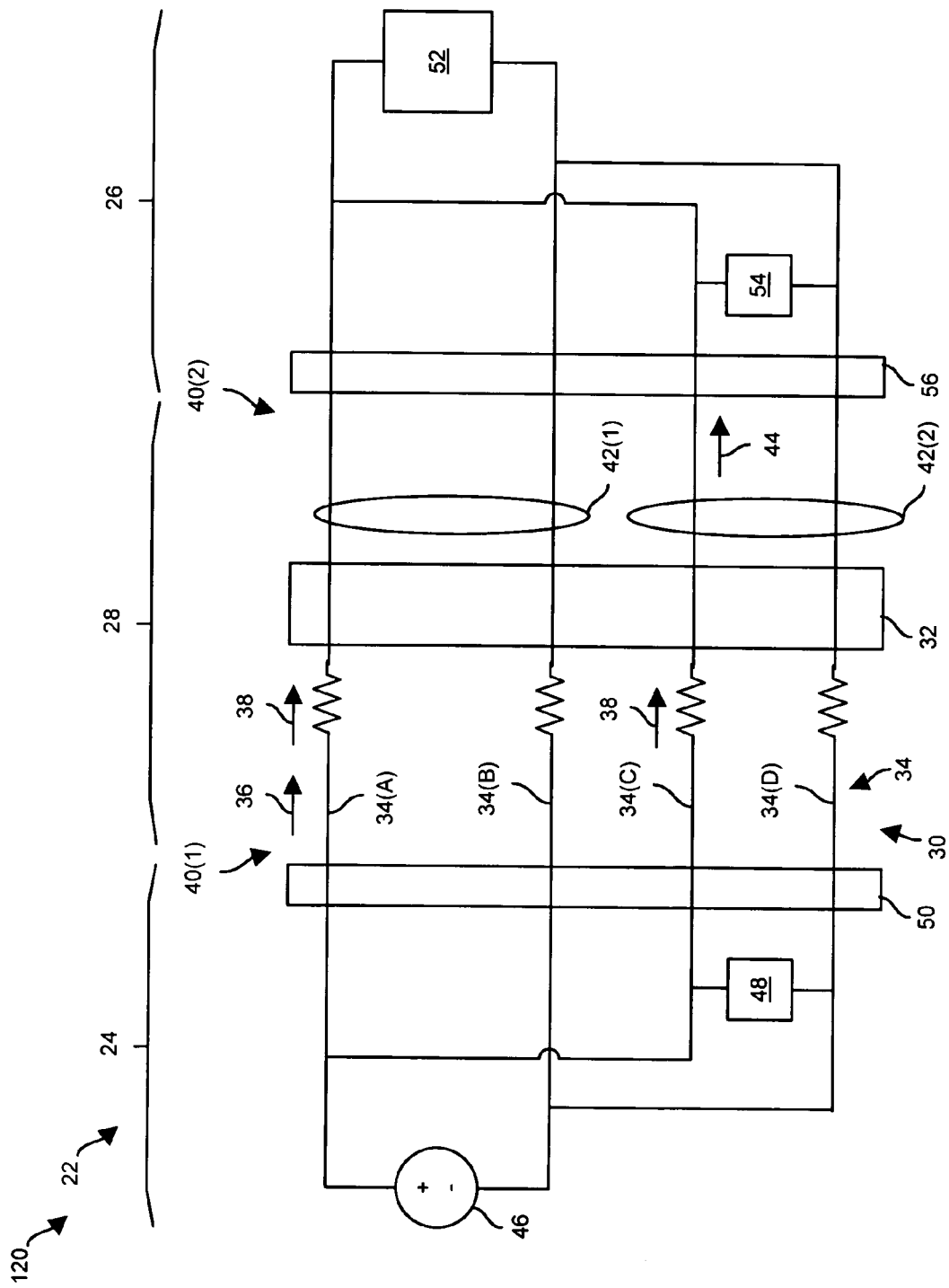
FIG. 5 shows an alternative layout of an electronic system which controls power delivery to a remotely powerable device by temperature sensing based on changes in resistance through conductors carrying only power.

FIG. 5 shows an alternative layout 120 for a PoE system 22 which controls the supplying of power based on temperature change results which are determined from resistance measurements. The layout 120 is similar to the layout 20 of FIG. 1 except that, in the layout 120, the monitoring circuits 48, 54 are configured to monitor voltage and current on the conductor pairs 34(C), 34(D) rather than on the conductor pairs 34(A), 34(B). As mentioned earlier, the second set 42(2) of conductor pairs 34(C), 34(D) does not need to carry the communications signals 36 between the PSE 24 and the PD 26 (e.g., in the case of 10/100 Ethernet), but nevertheless is involved in conveying power from the PSE 24 to the PD 26.

With the layout 120, the monitoring circuits 48, 54 effectively measure voltage and current on the conductor pairs 34(C), 34(D). That is, the monitoring circuits 48, 54 measure the output voltage of the PSE 24 and the input voltage of the PD 26 across the conductor pairs 34(C), 34(D), as well as the current 44 through the conductor pairs 34(C), 34(D). (Recall that the monitoring circuits 48, 54 are shown as crossing conductor pairs for simplicity but preferably include series connected resistors for current sensing). Since these conductor pairs 34(C), 34(D) are susceptible to overheating and pose a threat to causing damage, the PSE 24 would be able to effectively determine whether the temperature of the communications pathway 28 has risen to above a dangerous level.

Figure 6:
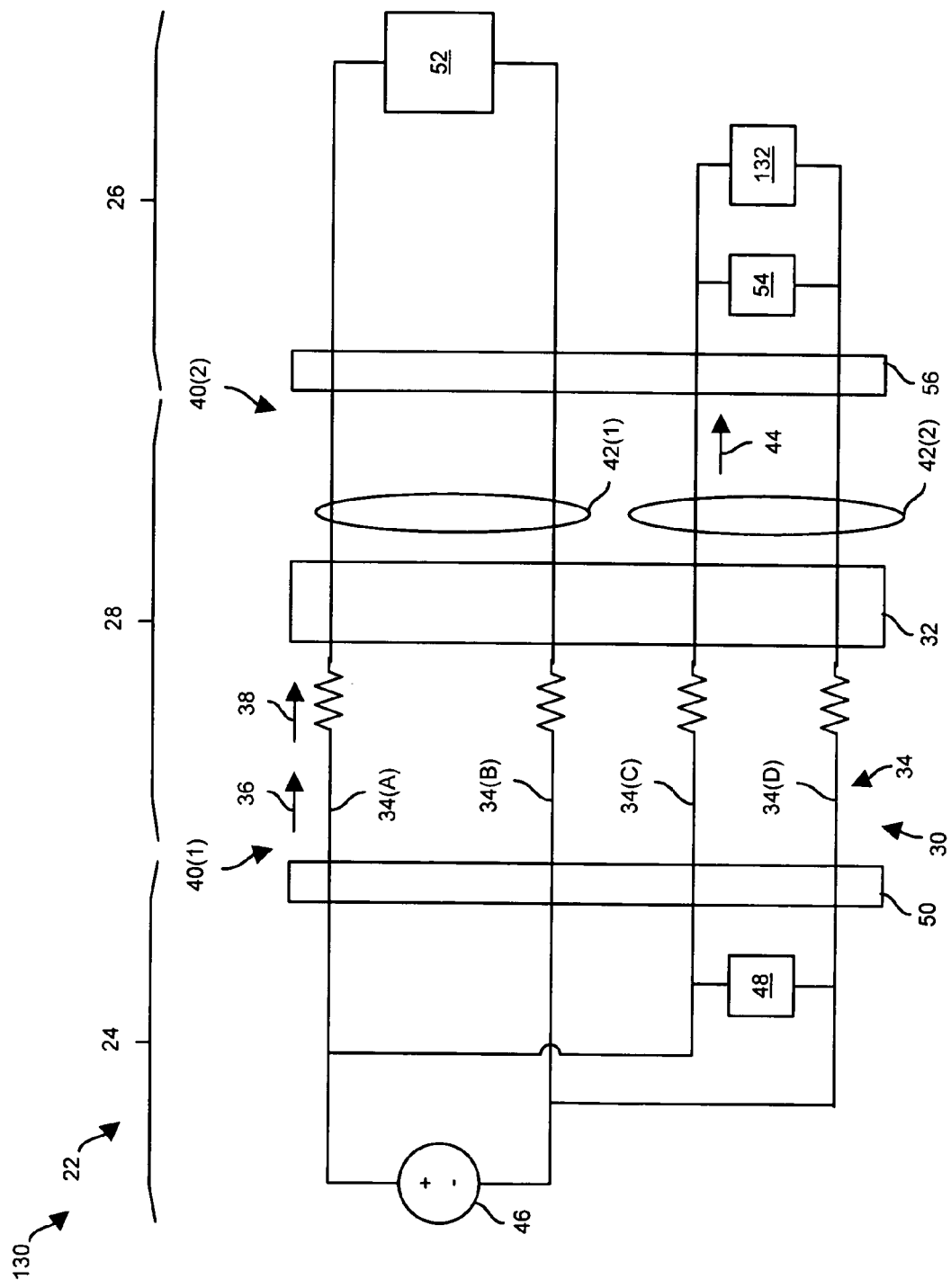
FIG. 6 shows an alternative layout of an electronic system which controls power delivery to a remotely powerable device by temperature sensing based on changes in resistance through conductors which do not carry either communications signals or power.

FIG. 6 shows another layout 130 for a PoE system 22 which controls the supplying of power based on temperature change results which are determined from resistance measurements. The layout 130 is similar to the layout 120 of FIG. 5 except that, in the layout 130, the monitoring circuits 48, 54 are configured to monitor voltage and current on the conductor pairs 34(C), 34(D) but the conductor pairs 34(C), 34(D) are not involved in supplying power to the PD 26. Accordingly, the second set 42(2) of conductor pairs 34(C), 34(D) are utilized for temperature monitoring but are otherwise unused.

In the layout 130, the PD 26 provides a short circuit 132 (or alternatively a load 132) across the conductor pairs 34(C), 34(D) in order to form a close circuit that enables the monitoring circuits 48, 54 to effectively measure voltage and current on the conductor pairs 34(C), 34(D) (i.e., current measuring via series connected resistors). As a result, the monitoring circuits 48, 54 are capable of measuring the output voltage of the PSE 24 and the input voltage of the PD 26 across the conductor pairs 34(C), 34(D), as well as the current 44 through the conductor pairs 34(C), 34(D), without the need for electrical access to the first set 42(1) of conductor pairs 34(A), 34(B) which carry both communications and power.

Figure 7:
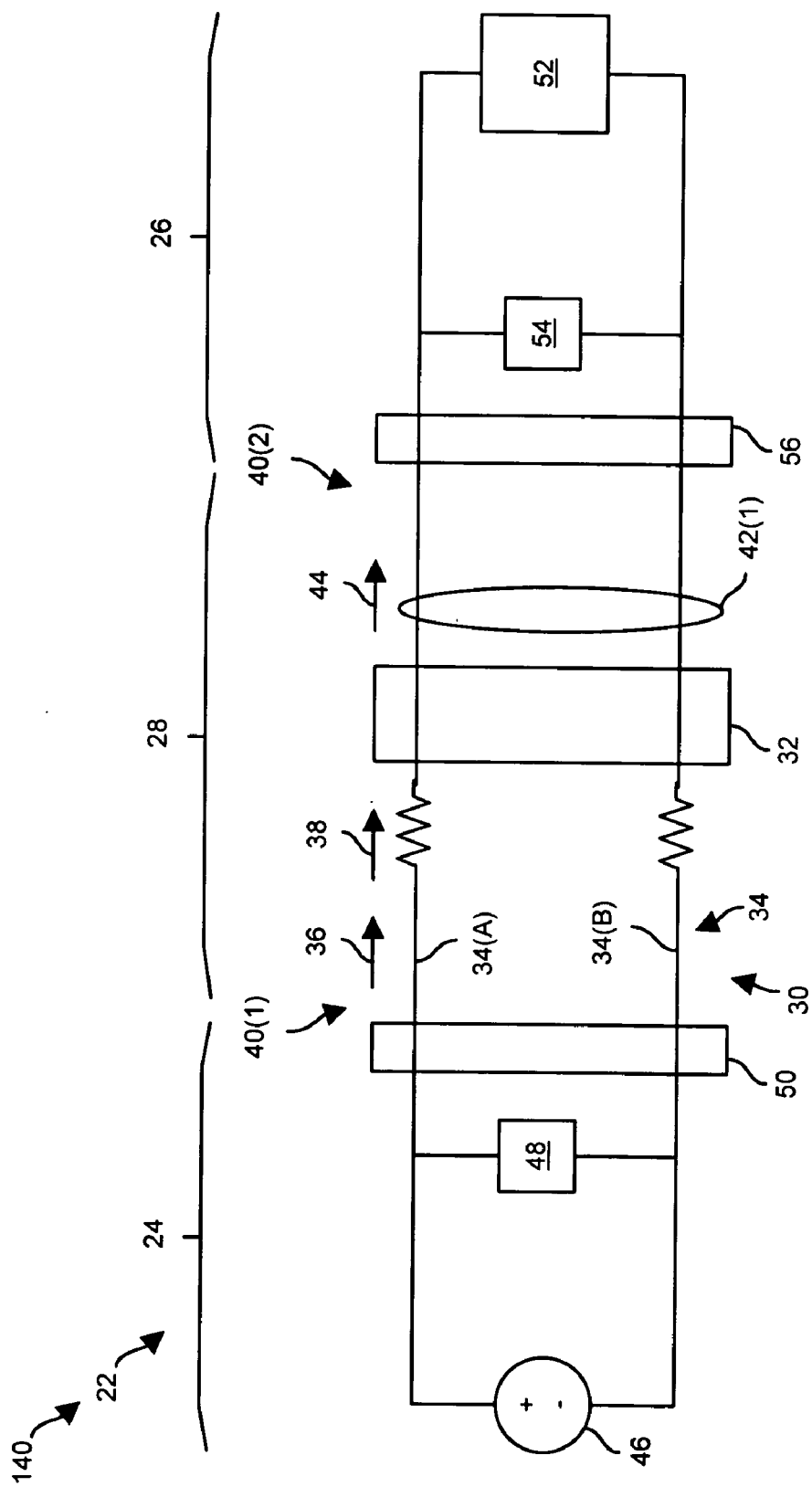
FIG. 7 shows an alternative layout of an electronic system which controls power delivery to a remotely powerable device by temperature sensing based on changes in resistance through conductors carrying communications signals and power without power being supplied through an additional set of conductors.

FIG. 7 shows an alternative layout 140 for a PoE system 22 which controls the supplying of power based on temperature change results which are determined from resistance measurements. The layout 140 is similar to the layout 20 of FIG. 1 except that, in the layout 140, the second set 42(2) of conductor pairs 34(C), 34(D) is not involved in conveying power from the PSE 24 to the PD 26. In some arrangements, the second set 42(2) of conductor pairs 34(C), 34(D) nevertheless carries data.

With the layout 140, the monitoring circuits 48, 54 effectively measure voltage and current on the first set 42(1) of conductor pairs 34(A), 34(B) as in the layout 20 of FIG. 1. That is, the monitoring circuits 48, 54 are configured to measure the output voltage of the PSE 24 and the input voltage of the PD 26 across the conductor pairs 34(A), 34(B), as well as the current 44 (i.e., current measuring via series connected resistors) through the conductor pairs 34(A), 34(B) to enable the PSE 24 to generate a temperature change result 104 based on determines resistances through the communications pathway 28, and ultimately selectively enable, scale back or disable delivery of power 38 to the PD 26 through the communications pathway 28 based on the temperature change result 104.

As mentioned above, improved techniques control supplying power to a remotely powerable device (e.g., a PD 26) based on generating temperature change results 104 which are determined from resistance measurements (e.g., using the temperature coefficient of cable conductor material of a communications pathway 28). Such resistance measurements are easily obtainable and thus provide convenient and reliable means of temperature measurement.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the system layouts of FIGS. 1, 5, 6 and 7 were provided to illustrate particular arrangements and that other layouts are suitable as well. In particular, in some arrangements, the communications pathway 28 carries data through all four conductor pairs 34. In some arrangements, the monitoring circuits 48, 54 sense voltage across and current through multiple sets 42 of conductor pairs 34. In other arrangements, the number of conductor pairs 34 within the communications pathway is a number other than four (e.g., two, six, eight, and so on). Other combinations and variations are intended to belong to various embodiments and arrangements as well.

What is claimed is:

1. In power-sourcing equipment, a method for controlling delivery of power to a remotely powerable device through a communications pathway connecting the power-sourcing equipment to the remotely powerable device, the method comprising:
    obtaining an initial resistance value representing an initial resistance of the communications pathway;
    after obtaining the initial resistance value, obtaining an operating resistance value representing an operating resistance of the communications pathway;
    generating a temperature change result based on the initial resistance value and the operating resistance value; and
    selectively one of enabling and disabling delivery of power to the remotely powerable device through the communications pathway based on the temperature change result.

2. A method as in claim 1 wherein the power-sourcing equipment is configured to operate in (i) a discovery phase to discover whether the remotely powerable device is ready to receive power through the communications pathway, and (ii) a delivery phase to deliver power to the remotely powerable device through the communications pathway after the power-sourcing equipment has discovered that the remotely powerable device is ready to receive power through the communications pathway; and wherein obtaining the initial resistance value includes:
    acquiring an initial remote voltage value from the remotely powerable device through the communications pathway, the initial remote voltage value representing an input voltage at the remotely powerable device during the discovery phase; and
    generating the initial resistance value based on the initial remote voltage value.

3. A method as in claim 2 wherein generating the initial resistance value includes:
    measuring an initial local voltage value at the power-sourcing equipment, the initial local voltage value representing an output voltage at the power-sourcing equipment during the discovery phase;
    measuring a current value representing an amount of current through the communications pathway during the discovery phase; and
    producing the initial resistance value based on (i) the initial remote voltage value representing the input voltage at the remotely powerable device during the discovery phase, (ii) the initial local voltage value representing the output voltage at the power-sourcing equipment during the discovery phase, and (iii) the current value representing the amount of current through the communications pathway during the discovery phase.

4. A method as in claim 1 wherein the power-sourcing equipment is configured to operate in (i) a discovery phase to discover whether the remotely powerable device is ready to receive power through the communications pathway, and (ii) a delivery phase to deliver power to the remotely powerable device through the communications pathway after the power-sourcing equipment has discovered that the remotely powerable device is ready to receive power through the communications pathway; and wherein obtaining the initial resistance value includes:
    acquiring an operating remote voltage value from the remotely powerable device through the communications pathway, the initial remote voltage value representing an input voltage at the remotely powerable device during the delivery phase; and
    generating the operating resistance value based on the operating remote voltage value.

5. A method as in claim 4 wherein generating the operating resistance value includes:
    measuring an operating local voltage value at the power-sourcing equipment, the operating local voltage value representing an output voltage at the power-sourcing equipment during the delivery phase;
    measuring a current value representing an amount of current through the communications pathway during the delivery phase; and
    producing the operating resistance value based on (i) the operating remote voltage value representing the input voltage at the remotely powerable device during the delivery phase, (ii) the operating local voltage value representing the output voltage at the power-sourcing equipment during the delivery phase, and (iii) the current value representing the amount of current through the communications pathway during the delivery phase.

6. A method as in claim 1 wherein the communications pathway includes a cable having a set of signal carrying conductors and a set of unused conductors; and wherein obtaining the operating resistance value includes:
    monitoring voltage on the set of signal carrying conductors without monitoring voltage on the set of unused conductors.

7. A method as in claim 1 wherein the communications pathway includes a cable having a set of signal carrying conductors and a set of unused conductors; and wherein obtaining the operating resistance value includes:
    monitoring voltage on the set of unused conductors without monitoring voltage on the set of signal carrying conductors.

8. A method as in claim 1 wherein the communications pathway includes a cable having conductors formed of copper material; wherein the temperature change result represents a change in temperature of the copper material; and wherein generating the temperature change result includes:
    producing the temperature change result based on (i) the initial resistance value, (ii) the operating resistance value, and (iii) a temperature coefficient of the copper material.

9. A method as in claim 8 wherein selectively one of enabling and disabling delivery of power to the remotely powerable device through the communications pathway includes:
    comparing the temperature change result with a predetermined threshold;
    enabling delivery of power to the remotely powerable device through the cable when the temperature change result is less than the predetermined threshold; and
    disabling delivery of power to the remotely powerable device through the cable when the temperature change result is greater than the predetermined threshold.

10. A method as in claim 9 wherein the predetermined threshold represents a temperature change of more than 10 degrees Celsius; and wherein disabling delivery of power to the remotely powerable device includes:

preventing delivery of power to the remotely powerable device through the cable when the temperature change result exceeds the predetermined threshold representing the temperature change of more than 10 degrees Celsius.

11. A method as in claim 1:
wherein obtaining the initial resistance value representing the initial resistance of the communications pathway includes dynamically calculating, at the power-sourcing equipment, as the initial resistance value, an actual initial resistance amount from a first set of voltages and a first set of currents measured at a startup time range during which the remotely powerable device (PD) is starting up but before the PD reaches a fully powered state; and wherein obtaining the operating resistance value representing the operating resistance of the communications pathway includes dynamically calculating, at the power-sourcing equipment the operating resistance, from a second set of voltages and a second set of currents at an operational time range during which the PD is in a fully powered state.

12. A method as in claim 1:
wherein the communications pathway includes a first conductor pair along which a communication signal transmits from the power-sourcing equipment to the remotely powerable device, the first conductor pair being a differential twisted pair for differential signaling in high speed communications;

wherein the communications pathway includes a second conductor pair along which the communication signal transmits from the remotely powerable device to the power-sourcing equipment, the second conductor pair being a differential twisted pair for differential signaling in high speed communications;

wherein the communications pathway includes a third conductor pair and a fourth conductor pair, the third conductor pair and the fourth conductor pair being twisted pairs;

wherein the communications pathway is constructed and arranged to deliver current from the power-sourcing equipment to the remotely powerable device along the first conductor pair and the third conductor pair; and wherein the communications pathway is constructed and arranged to return current from remotely powerable device to the power-sourcing equipment along the second conductor pair and the fourth conductor pair.

13. A method as in claim 12 wherein obtaining an initial resistance value representing an initial resistance of the communications pathway includes:

measuring, at a startup time range during which the remotely powerable device (PD) is starting up but before the PD reaches a fully powered state, a first potential difference across the first twisted pair and the second twisted pair at a PD side of the communications pathway;

in response to measuring the first potential difference, outputting a first analog voltage signal indicating a PD voltage;

measuring, at the startup time range during which the PD is starting up but before the PD reaches a fully powered state, a current through one of the first twisted pair and the second twisted pair of the communications pathway;

in response to measuring the current, outputting an analog current signal indicating the current;

converting the first analog voltage signal to a first digital voltage signal at a first analog-to-digital converter (ADC);

converting the analog current signal to a digital current signal at the first ADC;

sending the first digital voltage signal and the digital current signal through the second conductor pair to the power-sourcing equipment (PSE);

measuring, at the startup time range during which the PD is starting up but before the PD reaches a fully powered state, a second potential difference across the first twisted pair and the second twisted pair at a PSE side of the communications pathway;

in response to measuring the second potential difference, outputting a second analog voltage signal indicating a PSE voltage, converting the second analog voltage signal to a second digital voltage signal at a second ADC; and calculating at the power-sourcing equipment the initial resistance by dividing the difference between the PSE voltage and the PD voltage by the current.

14. A method as in claim 13 wherein obtaining an operating resistance value representing an operating resistance of the communications pathway includes:

measuring, at an operational time range during which the PD is in a fully powered state, a first operational potential difference across the first twisted pair and the second twisted pair at the PD side of the communications pathway;

in response to measuring the first operational potential difference, outputting a first analog operational voltage signal indicating an operational PD voltage;

measuring, at the operational time range during which the PD is in a fully powered state, an operational current through one of the first twisted pair and the second twisted pair of the communications pathway;

in response to measuring the operational current, outputting an analog operational current signal indicating the operational current, converting the first analog operational voltage signal to a first digital operational voltage signal at the first ADC;

converting the analog operational current signal to a digital operational current signal at the first ADC;

sending the first digital operational voltage signal and the digital operational current signal through the second conductor pair to the power-sourcing equipment;

measuring, at the operational time range during which the PD is in a fully powered state, a second operational potential difference across the first twisted pair and the second twisted pair at the PSE side of the communications pathway;

in response to measuring the second operational potential difference, outputting a second analog operational voltage signal indicating an operational PSE voltage;

converting the second analog operational voltage signal to a second digital operational voltage signal at the second ADC; and calculating at the power-sourcing equipment the operational resistance by dividing the difference between the operational PSE voltage and the operational PD voltage by the operational current.

15. Power-sourcing equipment, comprising:
a power source;
an interface configured to connect to a communications pathway leading to a remotely powerable device; and
a controller interconnected between the power source and the interface, the controller being configured to:
obtain an initial resistance value representing an initial resistance of the communications pathway;

after obtaining the initial resistance value, obtain an operating resistance value representing an operating resistance of the communications pathway;

generate a temperature change result based on the initial resistance value and the operating resistance value; and selectively one of enable and disable delivery of power to the remotely powerable device through the communications pathway based on the temperature change result.

16. Power-sourcing equipment as in claim 15 wherein the power-sourcing equipment is configured to operate in (i) a discovery phase to discover whether the remotely powerable device is ready to receive power through the communications pathway, and (ii) a delivery phase to deliver power to the remotely powerable device through the communications pathway after the power-sourcing equipment has discovered that the remotely powerable device is ready to receive power through the communications pathway; and wherein the controller, when obtaining the initial resistance value, is configured to:

acquire an initial remote voltage value from the remotely powerable device through the communications pathway, the initial remote voltage value representing an input voltage at the remotely powerable device during the discovery phase; and generate the initial resistance value based on the initial remote voltage value.

17. Power-sourcing equipment as in claim 16 wherein the controller, when generating the initial resistance value, is configured to:

measure an initial local voltage value at the power-sourcing equipment, the initial local voltage value representing an output voltage at the power-sourcing equipment during the discovery phase;

measure a current value representing an amount of current through the communications pathway during the discovery phase; and produce the initial resistance value based on (i) the initial remote voltage value representing the input voltage at the remotely powerable device during the discovery phase, (ii) the initial local voltage value representing the output voltage at the power-sourcing equipment during the discovery phase, and (iii) the current value representing the amount of current through the communications pathway during the discovery phase.

18. Power-sourcing equipment as in claim 15 wherein the power-sourcing equipment is configured to operate in (i) a discovery phase to discover whether the remotely powerable device is ready to receive power through the communications pathway, and (ii) a delivery phase to deliver power to the remotely powerable device through the communications pathway after the power-sourcing equipment has discovered that the remotely powerable device is ready to receive power through the communications pathway; and wherein the controller, when obtaining the initial resistance value, is configured to:

acquire an operating remote voltage value from the remotely powerable device through the communications pathway, the initial remote voltage value representing an input voltage at the remotely powerable device during the delivery phase; and generate the operating resistance value based on the operating remote voltage value.

19. Power-sourcing equipment as in claim 18 wherein the controller, when generating the operating resistance value, is configured to:

measure an operating local voltage value at the power-sourcing equipment, the operating local voltage value representing an output voltage at the power-sourcing equipment during the delivery phase;

measure a current value representing an amount of current through the communications pathway during the delivery phase; and produce the operating resistance value based on (i) the operating remote voltage value representing the input voltage at the remotely powerable device during the delivery phase, (ii) the operating local voltage value representing the output voltage at the power-sourcing equipment during the delivery phase, and (iii) the current value representing the amount of current through the communications pathway during the delivery phase.

20. Power-sourcing equipment as in claim 15 wherein the communications pathway includes a cable having a set of signal carrying conductors and a set of unused conductors; and wherein the controller, when obtaining the operating resistance value, is configured to:

monitor voltage on the set of signal carrying conductors without monitoring voltage on the set of unused conductors.

21. Power-sourcing equipment as in claim 15 wherein the communications pathway includes a cable having a set of signal carrying conductors and a set of unused conductors; and wherein the controller, when obtaining the operating resistance value, is configured to:

monitor voltage on the set of unused conductors without monitoring voltage on the set of signal carrying conductors.

22. Power-sourcing equipment as in claim 15 wherein the communications pathway includes a cable having conductors formed of copper material; wherein the temperature change result represents a change in temperature of the copper material; and wherein the controller, when generating the temperature change result, is configured to:

produce the temperature change result based on (i) the initial resistance value, (ii) the operating resistance value, and (iii) a temperature coefficient of the copper material.

23. Power-sourcing equipment as in claim 22 wherein the controller, when selectively one of enabling and disabling delivery of power to the remotely powerable device through the communications pathway, is configured to:

compare the temperature change result with a predetermined threshold;

enable delivery of power to the remotely powerable device through the cable when the temperature change result is less than the predetermined threshold; and disable delivery of power to the remotely powerable device through the cable when the temperature change result is greater than the predetermined threshold.

24. Power-sourcing equipment as in claim 23 wherein the predetermined threshold represents a temperature change of more than 10 degrees Celsius; and wherein the controller, when disabling delivery of power to the remotely powerable device, is configured to:

prevent delivery of power to the remotely powerable device through the cable when the temperature change result exceeds the predetermined threshold representing the temperature change of more than 10 degrees Celsius.

25. Power-sourcing equipment as in claim 15 wherein the controller is further configured to:

measure actual power loss through the communications pathway;

adjust a power budget based on the measured actual power loss; and allocate power to other devices based on the adjusted power budget.

26. Power-sourcing equipment as in claim 15 wherein:

the communications pathway includes a cable having a plurality of pairs of electrical conductors, each electrical conductor made of copper wire and capable of transmitting communications signals and power signals along the cable;

the initial resistance of the communications pathway is an initial resistance along the plurality of pairs of electrical conductors made of copper; and the operating resistance of the communications pathway is an operating resistance along the plurality of pairs of electrical conductors made of copper.

27. Power-sourcing equipment as in claim 26 wherein the cable with the plurality of pairs of electrical conductors made of copper wire is one of category 3 cable, category 5 cable, and category 6 cable.

28. Power-sourcing equipment as in claim 15:

wherein the controller is configured to obtain the initial resistance value representing the initial resistance of the communications pathway by being configured to dynamically calculate, at the power-sourcing equipment, as the initial resistance value, an actual initial resistance amount from a first set of voltages and a first set of currents measured at a startup time range during which the remotely powerable (PD) device is starting up but before the PD reaches a fully powered state; and wherein the controller is configured to obtain the operating resistance value representing the operating resistance of the communications pathway by being configured to dynamically calculate at the power-sourcing equipment the operating resistance from a second set of voltages and a second set of currents at an operational time range during which the PD is in a fully powered state.

29. In power-sourcing equipment, a method for controlling delivery of power to a remotely powerable device through a communications pathway connecting the power-sourcing equipment to the remotely powerable device, the method comprising:

obtaining an initial resistance value representing an initial resistance of the communications pathway;

after obtaining the initial resistance value, obtaining an operating resistance value representing an operating resistance of the communications pathway;

generating a temperature change result based on the initial resistance value and the operating resistance value;

generating a measure of power dissipated in the communications pathway;

selectively one of enabling, scaling back, and disabling delivery of power to the remotely powerable device through the communications pathway based on the temperature change result; and storing power-related data including the measure of power dissipated in the communications pathway as a history log in memory.

30. Power-sourcing equipment, comprising:

a power source;

an interface configured to connect to a communications pathway leading to a remotely powerable device; and a controller interconnected between the power source and the interface, the controller being configured to control delivery of power to the remotely powerable device through the communications pathway, the controller including:

means for obtaining an initial resistance value representing an initial resistance of the communications pathway;

means for obtaining an operating resistance value representing an operating resistance of the communications pathway after obtaining the initial resistance value;

means for generating a temperature change result based on the initial resistance value and the operating resistance value; and means for selectively one of enabling and disabling delivery of power to the remotely powerable device through the communications pathway based on the temperature change result.

31. A smart remotely powerable device, comprising:

a monitoring circuit configured to measure electrical parameters of copper wire in a cable used in determining a temperature change in the cable leading from a power source to the smart remotely powerable device;

a communications circuit configured to communicate with the power source; and a controller configured to perform a series of operations, the controller being further configured to scale back power consumption while performing the series of operations in response to receipt of a power reduction command sent from the power source to the controller through the communications circuit when the power source detects a particular temperature change.

32. A method as in claim 1 wherein:

the communications pathway includes a cable having a plurality of pairs of electrical conductors, each electrical conductor made of copper wire and capable of transmitting communications signals and power signals along the cable;

the initial resistance of the communications pathway is an initial resistance along the plurality of pairs of electrical conductors made of copper; and the operating resistance of the communications pathway is an operating resistance along the plurality of pairs of electrical conductors made of copper.

33. A method as in claim 32 wherein the cable having the plurality of pairs of electrical conductors made of copper wire is one of category 3 cable, category 5 cable, and category 6 cable.

* * * * *